3,066,159
REACTION PRODUCT OF POLYOLS AND
EPOXIDIZED FATTY COMPOUNDS
Melvin De Groote, St. Louis, and Jen-Pu Cheng, Rock Hill, Mo., assignors to Petrolite Corporation, a corporation of Delaware
No Drawing. Filed Nov. 29, 1960, Ser. No. 72,304
1 Claim. (Cl. 260—404)

This application is a continuation-in-part of our copending application Serial No. 532,121, filed September 1, 1955.

The present invention is concerned with combining certain oxyalkylation-susceptible polyols composed exclusively of carbon, hydrogen and oxygen with epoxidized fatty acid derivatives so as to introduce a fatty acid radical by an ether linkage. Such linkage is, of course, differentiated from an ester linkage by the fact that it is not susceptible to saponification or hydrolysis.

The polyols employed are characterized by freedom from any radical having 8 uninterrupted carbon atoms and the molecular weights, including those obtained by oxyalkylation, may run as high as 10,000. The polyols may be water-soluble in almost any proportion as in the case of sorbitol, glycerol, diglycerol, ethylene glycol, low molecular weight propyleneglycols, etc. They may be water insoluble by virtue of the fact that a water-insoluble glycol is employed, such as a higher molecular weight polypropyleneglycol, for instance, molecular weight of 1,000 or more, or even a fairly low molecular weight polybutyleneglycol, for instance, in the range of 300 to 500. Furthermore, the polyols may be water-insoluble by virtue of the fact that an initially water-soluble polyol of the kind previously mentioned has been reacted with propylene oxide, butylene oxide, or the like, to render the product insoluble. Similarly, such product can be resolubilized, i.e., rendered soluble in water again by oxyalkylation with ethylene oxide, glycide or the like. Inversely, one may start with a water-insoluble glycol such as a high molecular weight polypropyleneglycol, or a polybutyleneglycol and react with ethylene oxide or glycide or both so as to obtain a water-soluble product.

Furthermore, one may use glycols of the kind referred to above and, generally speaking, obtained by the use of one or more olefin oxides of the kind previously described and having distinct surface active properties. Such surface active properties are characterized by ability to change certain surface active characteristics of either an aqueous or nonaqueous fluid. These characteristics include the ability to lower the surface tension of a liquid, for instance, water or paraffin oil; to change the interfacial tension at the interface between water and oil or water and some other liquid; and the ability to form emulsions, to show dispersing properties for solids and liquids, such as a dispersion of carbon black in oil or in water, or at least to some extent possibly show detergent or detergent-like properties. The simplest test of all is the ability of the product to disperse in water, although it is recognized that at times there may be a profound increase in hydrophile properties before this threshold is reached. In light of these well-known properties it is believed the characteristics included in the claims are perfectly obvious to those skilled in the art.

Inversely, just as hydrophile effects become obvious by measuring the balance between the hydrophobe portion and the hydrophile portion, it also follows that as this balance is inverted the same properties tend to be reduced as for example, in the oxypropylation of ethylene glycol or polyethylene glycol as previously specified.

The reason valuable compounds can be obtained from such a wide variety of initial reactants carrying through the spectrum of low molal water soluble polyols such as sorbitol, glycerol, diglycerol, triglycerol, low molal ethylene glycols, low molal propyleneglycols, through an area having surface activity in either water or oil and into comparatively high molal water insoluble products such as high molal polypropyleneglycols, high molal polybutyleneglycols, etc., is because the acyl radical to which the oxirane ring is attached introduces a radical having up to 22 uninterrupted carbon atoms and usually 18 uninterrupted carbon atoms as in the instance of the higher fatty acids. Thus, depending on the number of such radicals so introduced, the hydrophobe character can be increased enormously at the intermediate stage.

The hydrophobe character can then be offset by introduction of a polyamine or oxyalkylated polyamine so as to form an amine radical or ester radical.

For convenience, what is said hereinafter will be divided into five parts:

Part 1 is concerned with the preparation of suitable epoxides which include an acyl radical having at least 8 carbon atoms;

Part 2 is concerned with suitable polyols;

Part 3 is concerned with the products which are derived from reactants described in Part One and Part Two;

Part 4 is concerned with uses for the herein described products of reaction; and Part 5 is concerned with derivatives which may be obtained from the herein described resultant, and uses for said derivatives obtained by further reaction.

PART 1

The epoxidation of ethylenic compounds and particularly esters of unsaturated fatty acids, unsaturated aliphatic alcohols, and the unsaturated fatty acids themselves, is well known. For instance, it has been described in the following patents:

U.S. Patents Nos.:

| | |
|---|---|
| 2,443,280 | 2,556,145 |
| 2,445,892 | 2,567,237 |
| 2,457,328 | 2,567,930 |
| 2,458,484 | 2,569,502 |
| 2,485,160 | 2,661,367 |
| 2,487,829 | 2,686,805 |
| 2,510,905 | 2,692,271 |

Additionally epoxidation procedures have been described in the trade literature of organizations which supply one or more reactants employed in the procedure. For instance, see Bulletin P 63–355 entitled "Hydrogen Peroxide-Resin Technique for the Preparation of Peracetic Acid," E. I. du Pont de Nemours & Company; Bulletin P 61–454 entitled "Hydrogen Peroxide-Resin Technique for Epoxidation of Unsaturated Fats, Oils, and Derivatives," E. I. du Pont de Nemours & Company; and booklet entitled "Hydrogen Peroxide" issued by Buffalo Electro-Chemical Company, Inc. See also Chemical Week, August 21, 1945, page 100; and Chemical Week, December 25, 1954, page 32.

An excellent brief description is found in aforementioned U.S. Patent No. 2,692,271, dated October 19, 1954, to Greenspan et al. What is said immediately following is substantially as it appears in said patent.

In broad aspect, epoxidation comprises a reaction at a point of unsaturation of the ethylene type in a carbon compound whereby the unsaturated linkage is by the addition of oxygen changed to an oxirane compound.

Many methods of epoxidation have been suggested. For instance, the ethylene linkage has been reacted upon by the employment of perbenzoic acid in a non-aqueous solvent such as chloroform and peracetic acid used in aqueous solution. Many other peracids have been found effective as epoxidizing agents, perphthalic and percamphoric, among others.

In general, epoxidation of the olefinic compound has been found to proceed best by the employment of peracetic acid and other similar per-compounds. Swern, in U.S. Patent 2,411,762, recommends that epoxidation be performed in special organic solvents, while Terry and Wheeler in 2,458,484 perform epoxidation under vigorous agitation of an aqueous solution of peracetic acid and an insoluble long chain olefinic material. See also Findley et al., J.A.C.S., 67, 412–414 (1945). All of these investigators recognize the necessity of maintaining relatively low temperatures in order to favor the formation of the epoxy compound and to lessen the production, at the olefinic linkage, ultimately of a dihydroxy compound or glycol, by reason of the formation of an hydroxyacetoxy compound.

However, from a practical operating and commercial point of view, aqueous peracetic acid will be preferred as the epoxidizing agent by reason of its ready formation from acetic acid, glacial or aqueous, or from acetic anhydride by mere reaction with aqueous hydrogen peroxide and, as the latter is now available in high weight concentrations, corresponding high peracid concentrations are available for use.

When the olefinic linkage is reacted with a peracid, it is possible to obtain either or both of two end products; the one being the oxirane compound which may be illustrated broadly as

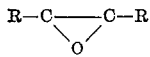

that is the epoxy compound, the other being the glycol, or derivative thereof, the formed being represented by

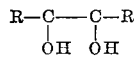

These are the possible end products, irrespective of any theoretical considerations of the mechanism of their formation, although in general the oxirane ring may be considered to be opened up with the production of a glycol by reaction with water, or the production of the hydroxy-acetoxy compound by reaction with acetic acid.

In an epoxidation reaction, several factors are important in determining the efficiency of reaction. One is the amount of the olefinic compound that has been changed in the reaction; another is the quantity of resultant product which exists in the oxirane condition, that is, the epoxy yield, and a third is the amount of peracid used.

Fatty acids and fatty acid derivatives which may be subjected to epoxidation by conventional procedures are illustrated by the following:

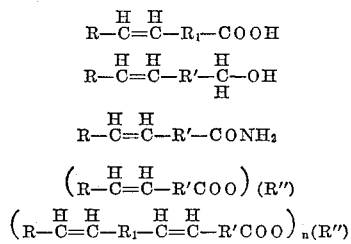

In the above formulas R and R' represent monovalent and divalent hydrocarbon radicals having at least 3 carbon atoms. $R_1$ is a divalent radical.

Stated another way, it is preferable that the ethylene linkage which is subjected to epoxidation is at least 2 carbon atoms removed from the terminal carbon atom or the carboxyl carbon atom, or what was initially the carboxyl carbon atom. For example, in the second formula, i.e., the formula of the alcohol, it will be noted of course that the carboxyl group has been converted into the terminal alcoholic radical.

In the last two formulas R'' represents the ester radical which may be monohydric, dihydric, trihydric, tetrahydric, etc.

In the last formula $n$ is a small whole number varying from 2 to 6 for example, which corresponds to the valency of the multivalent radical R''.

Referring now specifically to the naturally-occurring glycerides or the modified glycerides formed by the introduction of an acyl radical, such as the acetyl radical, ricinoleyl radical, oleyl radical, or the like, into castor oil it is to be noted the simpler products such as epoxidized soyabean oil or the like are available in the open market or one can prepare the same if desired. In a general way, of course, the most economical products are those derived from naturally-occurring glycerides as, for example, soyabean oil. Usually an effort is made to obtain the lowest iodine value consistent with commercial standards. If one started with soapmakers' grade olive oil theoretically one might obtain a product having substantially no iodine number and 3 oxirane rings per glyceride radical. Actually, this is not the case for the reason it is difficult by most procedures to obtain an iodine value from a monoethylenic acid glyceride which is less than 10 to 20, and unusual care is required to obtain an iodine value below 10. An iodine value of 10 under such circumstances would appear to be the ultimate goal as far as present commercial procedure is concerned.

If one employs soyabean oil which contains an approximate 50% linoleic acid as a glyceride and about 35% oleic acid, one may readily obtain a product which has on the average 1.5 oxirane rings per fatty acid radical. If one starts with a more highly unsaturated oil, such as linseed oil, one can approximate 2 oxirane rings per fatty acid molecule.

All that has been said previously is a matter of common knowledge and is stated in brief form in aforementioned U.S. Patent No. 2,556,145, dated June 5, 1951, to Niederhauser. For instance, this patent states in substantially verbatim form as follows:

The vegetable oils which when epoxidized may be used in practicing the present invention are those glycerides of saturated and unsaturated acids which have a degree of unsaturation represented by an iodine value of from 90 to 205 and in which the fatty acids neither are hydroxylated nor possess conjugated unsaturation. The semi-drying vegetable oils, which are primarily glycerides of oleic and linoleic acids, are preferred. Among those oils which may be used are epoxidized peanut, rapeseed, cottonseed, corn, tobacco seed, cucurbit, sunflower, safflower, poppyseed, linseed, perilla, and soybean oils. Of these epoxidized oils, soybean oil is particularly efficient. The effectiveness of the epoxidized oils in stabilizing chlorinated rubber is dependent upon both the concentration in which they are used and the degree to which they have been epoxidized; i.e., the number of epoxy groups that have been introduced. Theoretically, each carbon to carbon double bond of the original vegetable oil can be converted to an epoxy group. In practical operation this will seldom, if ever, be attained but it is desirable that highly epoxidized oils be used so that maximum stability be effected. It is recommended that there be used epoxidized oils containing an average of from 2 to 6 epoxy groups per molecule.

If the fatty acid group has some other functional group present, difficulty may be involved in obtaining optimum yields for some reason that is not entirely clear. This would apply, for example, to castor oil if reacted with a low molal acid such as acetic acid, propionic acid, or the like, then these difficulties appear to be eliminated. There also appears to be difficulty in obtaining suitable yields in the case of conjugated unsaturation. In some instances where the unsaturation is not conjugated there is indication that there may be a shift during reaction to produce conjugation. In other words, in the epoxidation of the fatty acid or fatty acid ester or the like, if the fatty acid is polyethylenic it is very important that the ethylenic radicals be non-conjugated. The fatty acids themselves may contain 8 to 22 carbon atoms. The best example of the monoethylenic acid is, of course, oleic acid and perhaps erucic acid. Both are readily available as glycerides. As to the polyethylenic acids, particular attention is directed to linoleic. As to an example of an acid having 3 ethylenic linkages attention is directed to linolenic. These acids, of course, are available in the form of glycerides, particularly mixed glycerides. Other polyethylenoic acids are obtained from oils of aquatic origin.

PART 2

The polyhydric alcohols include the glycols, polyglycols previously referred to, various trihydroxylated compounds such as glycerol trimethylolethane, glycerol trimethylolpropane, etc. See additionally the polyhydric alcohols and their oxyalkylation derivatives described in Tables 1, 2, 3 and 4 of U.S. Patent No. 2,552,528 dated May 15, 1951, to De Groote.

See also the glycols described as reactants in the table which appears in U.S. Patent No. 2,556,878 dated August 7, 1951, to Blair, as to a variety of polybutyleneglycols, polyethylene glycols and polypropyleneglycols, ranging in molecular weights up to 12,000, 15,000 or 20,000. See the catalogs of any one of a number of companies which make such glycols with particular reference to the catalog and the commercial literature of the Dow Chemical Company, Midland, Michigan, and Carbide & Carbon Corporation, New York City.

Briefly stated, there are available commercially butyleneglycols and polybutyleneglycols in molecular weights up to 1,000 or more. There are available ethyleneglycols and polyethyleneglycols in molecular weight up to 15,000 to 20,000. There are available propyleneglycols and polypropyleneglycols in molecular weights up to 2,000 and even up to 2,750 and perhaps 3,000. Others, or mixed glycols can be prepared by conventional procedures.

Our preference is to employ materials which are initially surface active in either an aqueous solvent or a nonaqueous solvent. Our preference is to use compounds which have been described in one or more of the patents previously referred to or in certain other patents, or in certain pending applications. For instance, aforementioned U.S. Patent No. 2,552,528 describes high molal oxypropylation derivatives of monomeric polyhydric compounds with the proviso that the initial polyhydric reactant have at least 4 hydroxyl radicals.

Similarly, U.S. Patent 2,552,529, dated May 15, 1951, to De Groote, describes high molal oxypropylation derivatives of monohydric polyhydric compounds with the proviso that the initial polyhydric reactant have at least 6 hydroxyl radicals and that there be present a radical having 6 carbon atoms in a single chain, at least 5 of which are directly attached to oxygen atoms.

U.S. Patent No. 2,673,882, dated March 30, 1954, to Griffin, describes a compound of the formula $$R([OA_1]_m[OA_2]_nOH)_6$$

wherein R is the residue of a hexitol, $A_1$ and $A_2$ represent, respectively, alkylene radicals of different 1,2-alkylene oxides containing no more than 3 carbon atoms, $m$ and $n$ each represent a number above 6, and the ratio of $m:n$ lies within the limits 1:3 to 3:1.

U.S. Patent No. 2,674,619 dated April 6, 1954, to Lundsted describes a cogeneric mixture of conjugated polyoxypropylene-polyoxyethylene compounds containing in their structure oxypropylene groups, oxyethylene groups and an organic radical derived from an organic compound containing a plurality of reactive hydrogen atoms.

In greater detail the same patent describes compounds having improved detergent properties, according to the formula 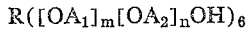—H where $y$ equals at least 15; and $(C_2H_4O)_{x+x'}$ equals 20–90% of the total weight of the compound.

Patent application, Serial No. 520,011, filed July 5, 1955, by De Groote, now abandoned, describes a surface-active cogeneric mixture; said surface-active mixture being in turn a cogeneric mixture of oxyalkylation derivatives of $HO(C_2H_4O)(C_2H_4O)_nH$, in which $n$ represents an integer which on the average is not over 6 including zero; said oxyalkylation involving (a) oxypropylation as an intermediate step, followed by (b) oxyethylation; said oxypropylated intermediate prior to oxyethylation being characterized by water insolubility; said final product being characterized by the fact that the hydrophobe property of the intermediate is offset to a significant degree by the final stage oxyethylation; the average theoretical molecular weight of said cogeneric mixture being not less than 1200 and not over 10,000.

Patent application, Serial No. 520,012 filed July 5, 1955, by De Groote, now abandoned, describes a surface-active cogeneric mixture; said surface-active mixture being in turn a cogeneric mixture of oxyalkylation derivatives of $HO(C_2H_4O)(C_2H_4O)_nH$, in which $n$ represents an integer which on the average is not over 39 including zero; said oxyalkylation involving (a) oxybutylation as an intermediate step, followed by (b) oxyethylation; said oxybutylated intermediate prior to oxyethylation being characterized by water insolubility; said final product being characterized by the fact that the hydrophobe property of the intermediate is offset to a significant degree by the final stage oxyethylation; the average theoretical molecular weight of said cogeneric mixture being not less than 850 and not over 10,000.

Patent application, Serial No. 520,013 filed July 5, 1955, by De Groote, now abandoned, describes a surface-active cogeneric mixture said surface-active mixture being in turn a cogeneric mixture of oxyalkylation derivatives of $HO(C_2H_4O)(C_2H_4O)_nH$, in which $n$ represents an integer which on the average is not over 39 including zero; said oxyalkylation involving (a) oxybutylation and oxypropylation as an intermediate step, followed by (b) oxyethylation; said oxybutylated intermediate prior to oxyethylation being characterized by water insolubility; said final product being characterized by water insolubility; said final product being characterized by the fact that the hydrophobe property of the intermediate is offset to a significant degree by the final stage oxyethylation; the average theoretical molecular weight of said cogeneric mixture being not less than 850 and not over 10,000.

PART 3

This Part 3 is concerned with the reaction between the two classes of reactants described in the foregoing Parts 1 and 2. The reaction involving rupture of the oxirane ring is essentially a variety of oxyalkylation and the reaction is so conducted at a temperature of about 65° C. to 170° C. for from about 1 to 5 hours with stirring and in the presence of an oxyalkylation catalyst. The procedure is simpler than is the case when ethylene oxide or propylene oxide is used for the reason that the reactants are nonvolatile as a rule and thus one does not have to use an autoclave or similar equipment. The oxyalkylation catalysts employed are the conventional ones for oxyalkylation of, for example, a phenol-aldehyde resin or a polyol with ethylene oxide or propylene oxide. The oxyalkylation catalysts include alkaline catalysts such as sodium methylate, caustic soda, caustic potash, potassium carbonate, and the like, and acid catalysts such as perchloric acid, phosphoric acid, dilute sulfuric acid, and the like. In a general way, the procedure employed is the same as in oxyalkylating with ethylene oxide or propylene oxide and the only precaution taken as a rule is to avoid temperatures above that required to rupture the oxirane ring for the reason that side reactions or secondary reactions may take place.

The molar ratio of polyol to epoxidized higher fatty acid material is at least about 0.5 to 1 mole of polyol per oxirane ring in the epoxidized material.

If for convenience the epoxidized fatty acid material is an ester and is indicated as R—A—R'COOR, where A designates the oxirane ring, then where the molar ratio of polyol to epoxidized ester is 0.5 to 1, the product will be

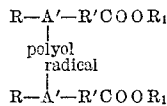

wherein A has been changed to A' to indicate that the oxirane ring has been opened. Similarly where the molar ratio of polyol to epoxidized ester is at least 1 to 1, the product will be

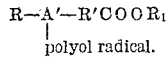

Since the polyols are polyfunctional, the reactants are first intimately admixed in liquid phase at temperatures of 0° to 70° for from one-quarter to several hours. Where the polyols are solids, they can be heated to their melting point or an inert solvent can be employed. The procedure is illustrated by Examples 1a, 5a, 12a, 21 and 35a and then by Table I which presents data covering the preparation of these and other products. In the examples, the epoxidized oleic acid, epoxystearamide, epoxybutyl stearate and epoxy methyl soyate employed contained an average of one oxirane ring per mole and the epoxidized soybean oil employed contained an average of 3 oxirane rings per mole.

*Example 1a*

A 300 ml. three-necked flask was fitted with a reflux condenser, a thermometer, and an efficient sealed stirrer. In the flask were placed 91 grams of anhydrous sorbitol which was heated to melting at a temperature of 110° C. After the sorbitol was all melted, 184 grams of epoxybutyl stearate were added and the well mixed reactants were heated to 120° C. Then 1.4 grams of sodium methylate were added and the heating was continued for half an hour at 120° C. and 3 hours at 165° C. The reaction was considered complete at the end of this heating period and the originally heterogeneous mixture became one clear homogeneous phase. The product was a clear, yellow very viscous liquid. It was soluble in alcohol, slightly soluble in benzene and insoluble in water.

*Example 5a*

A 500 ml. 3-necked resin flask was fitted with a reflux condenser, a thermometer, a dropping funnel and an efficient stirrer. In the flask was placed 110 grams of epoxy butyl stearate containing approximately one oxirane ring per mole and 300 grams of polyethylene glycol 1000. The flask was first heated to melt the polyglycol, then vigorous stirring was applied to bring the heterogeneous mixture into a fine emulson. When the temperature of the emulsion reached 65° C. heating was discontinued and 0.4 gram of 70% perchloric acid was added as the catalyst. The reaction was exothermic in nature. It was kept at 70–75° C. by first ice cooling, then air cooling, then gentle heating. At the end of an hour, the mixture became clear, homogeneous and completely water dispersible. It was reacted for one more hour at 70–75° C. to insure complete reaction. The product was a clear light yellow liquid when hot, a soft white solid when cold. It was xylene and alcohol soluble and water dispersible. It was highly effective in the demulsification of water-in-oil type emulsions.

*Example 12a*

One mole of anhydrous sorbitol was oxyalkylated first with 30 moles of propylene oxide and then with 80 moles of ethylene oxide at 150–180° C. in the presence of sodium methoxide. (Cf. U.S. Patent 2,552,529 to De Groote.) To 332 grams of this reaction product, 1.7 grams of sodium methoxide and 45 grams of epoxy butyl stearate were added. The mixture was first stirred at room temperature for 10 minutes. Then heat was applied to maintain the reaction temperature at 115° C. for 2.5 hours and 170° C. for 2 hours. The equipment used was the same as used in Example 5a. At the end of the reaction the product was a brown colored semi-solid. It was soluble in xylene, alcohol and water and was effective as an emulsifier in oil-in-water type emulsions.

*Example 21a*

In the same equipment set up as used in Example 1a, 180 grams of epoxidized soybean oil and 210 grams of methoxy polyethylene glycol 350 were reacted at 75° C. for 3 hours in the presence of 0.39 gram of 70% perchloric acid. The reaction was carried out with frequent ice-water cooling during the first 25 minutes, then with gentle heating during the rest of the time. The product was a clear, light yellow, viscous liquid. It was soluble in xylene and alcohol and dispersible in water.

*Example 33a*

Anhydrous sorbitol was oxyalkylated with ethylene oxide in a 1 to 8 molal ratio. To 267 grams of this reaction product 320 grams of epoxy methyl soyate and 2.7 grams of sodium methoxide were added. The mixture was first reacted at 115° C. for 2 hours; then at 160° C. for 2.5 hours. The product was a dark brown homogeneous viscous liquid. It was completely water-soluble but was also xylene-soluble.

As previously noted, examples illustrated previously are representative of a larger group. The data in regard to this group appear in summarized form in Table I immediately following.

TABLE I

REACTION CONDITIONS

| Ex. No. | Oxirane containing reactant | Amt., gms. | Polyhydroxy containing reactant | Amt., gms. | Molal ratio | Catalyst used | Amt., gms. | Temp., °C. | Time, hrs. |
|---|---|---|---|---|---|---|---|---|---|
| 1a | Epoxy butyl stearate | 184 | Sorbitol | 91 | 1:1 | Sodium methylate | 1.4 | 120 / 165 | 0.5 / 3 |
| 2a | do | 184 | Polyethylene glycol 200 | 100 | 1:1 | do | 1.4 | 160 | 3 |
| 3a | do | 184 | Polyethylene glycol 400 | 200 | 1:1 | do | 2 | 160 | 3 |
| 4a | do | 92 | Polypropylene glycol 600 | 150 | 1:1 | do | 1.3 | 175 | 3 |
| 5a | do | 110 | Polyethylene glycol, 1000 | 300 | 1:1 | Perchloric acid, 70% | 0.4 | 70–75 | 2 |
| 6a | do | 36.8 | Polyethylene glycol, 6000 | 300 | 2:1 | do | 0.34 | 70–80 | 2 |
| 7a | do | 368 | Polypropylene glycol, 150 | 150 | 1:1 | do | 0.5 | 70 | 1.5 |
| 8a | do | 110 | Polypropylene glycol, 1025 | 308 | 1:1 | do | 0.41 | 70 | 2 |
| 9a | do | 368 | Glycerol | 92 | 1:1 | do | 0.46 | 65 | 2 |
| 10a | do | 184 | Methoxy polyethylene glycol, 750 | 375 | 1:1 | do | 0.56 | 70 | 2.5 |
| 11a | do | 184 | Polypropylene glycol, 150+10 ethylene oxide. | 285 | 1:1 | Sodium methoxide | 2.3 | 110–120 / 160–170 | 2.5 / 1 |
| 12a | do | 45 | Sorbitol +30 propylene oxide +80 ethylene oxide | 332 | 2:1 | do | 1.7 | 115 / 170 | 2.5 / 2 |
| 13a | do | 147 | Pentaerythritol +20 propylene oxide +10 ethylene oxide. | 347 | 2:1 | do | 2.5 | 115 / 170 | 2 / 2 |
| 14a | do | 368 | Glycerol +3 ethylene oxide | 118 | 2:1 | do | 2.4 | 115 / 170 | 2 / 2 |

TABLE I—Continued

REACTION CONDITIONS—Continued

| Ex. No. | Oxirane containing reactant | Amt., gms. | Polyhydroxy containing reactant | Amt., gms. | Molal ratio | Catalyst used | Amt., gms. | Temp., °C. | Time, hrs. |
|---|---|---|---|---|---|---|---|---|---|
| 15a | Epoxy butyl stearate | 221 | Diglycerol +8 ethylene oxide | 155 | 2:1 | Sodium methoxide | 1.9 | 115 / 170 | 2 / 2.5 |
| 16a | Epoxidized soybean oil | 300 | Ethylene glycol | 62 | 1:3 | Perchloric acid, 70% | 0.36 | 65 | 2 |
| 17a | ......do | 30 | Polyethylene glycol, 4000 | 400 | 1:3 | ......do | 0.43 | 70 | 2 |
| 18a | ......do | 300 | Propylene glycol | 76 | 1:3 | ......do | 0.38 | 75 | 3 |
| 19a | ......do | 60 | Polypropylene glycol, 2025 | 405 | 1:3 | ......do | 0.46 | 75 | 3 |
| 20a | ......do | 150 | Sorbitol | 91 | 1:3 | ......do | 1.2 | 138 | 5 |
| 21a | ......do | 180 | Methoxy polyethylene glycol, 350 | 210 | 1:3 | ......do | 0.39 | 75 | 3 |
| 22a | ......do | 150 | Methoxy polyethylene glycol, 550 | 275 | 1:3 | ......do | 0.43 | 75 | 3 |
| 23a | ......do | 90 | Polypropylene glycol, 150+20 ethylene oxide | 309 | 1:3 | Sodium methoxide | 2 | 110 / 170 | 3 / 1 |
| 24a | ......do | 90 | Polypropylene glycol, 150+5 butylene oxide +10 ethylene oxide | 285 | 1:3 | ......do | 1.8 | 115 / 170 | 2 / 2 |
| 25a | ......do | 90 | Glycerol +30 ethylene oxide | 423 | 1:3 | ......do | 2.6 | 110 / 170 | 1 / 2 |
| 26a | ......do | 160 | Glycerol +3 propylene oxide +9 ethylene oxide | 331 | 1:3 | ......do | 2.4 | 110 / 170 | 2 / 2 |
| 27a | ......do | 100 | Polyethylene glycol 200 | 74.2 | 1:3 | Sulfuric acid (50%) | 2.0 | 150 | 3 |
| 28a | ......do | 100 | ......do | 74.2 | 1:3 | Phosphoric acid (85%) | 1.0 | 150 | 3 |
| 29a | Epoxy methyl soyate | 192 | ......do | 120 | 1:1 | Perchloric acid, 70% | 0.3 | 65 | 2 |
| 30a | ......do | 160 | Polyethylene glycol, 600 | 300 | 1:1 | ......do | 0.46 | 68 | 2 |
| 31a | ......do | 192 | Polypropylene glycol, 425 | 255 | 1:1 | ......do | 0.44 | 75 | 2 |
| 32a | ......do | 320 | Butylene glycol | 90 | 1:1 | ......do | 0.41 | 75 | 2 |
| 33a | ......do | 320 | Butynediol, 1,4 | 86 | 1:1 | ......do | 0.4 | 55 | 4.5 |
| 34a | ......do | 320 | Diglycerol | 83 | 2:1 | ......do | 0.4 | 70 | 2 |
| 35a | ......do | 320 | Sorbitol +8 ethylene oxide | 267 | 2:1 | Sodium methoxide | 2.7 | 115 / 160 | 2 / 2.5 |
| 36a | ......do | 64 | Sorbitol +60 ethylene oxide | 282 | 2:1 | ......do | 1.7 | 115 / 160 | 2 / 3 |
| 37a | ......do | 128 | Sorbitol +6 propylene oxide +30 ethylene oxide | 370 | 2:1 | ......do | 2.5 | 115 / 160 | 2 / 3 |
| 38a | ......do | 128 | Pentaerythritol +20 ethylene oxide | 203 | 2:1 | ......do | 1.7 | 115 / 160 | 2 / 3 |
| 39a | ......do | 128 | Pentaerythritol +20 propylene oxide +10 ethylene oxide | 347 | 2:1 | ......do | 2.4 | 115 / 160 | 2 / 3 |
| 40a | Epoxidized oleic acid (25.2% in benzene) | 147.4 | Sorbitol | 91 | 1:1 | ......do | 2.1 | 110 / 160 | 2 / 2 |
| 41a | N-(n-hexyl)9,10-epoxy-stearamide | 127 | Glycerol | 46 | 1:1 | ......do | 2.5 | 110 / 160 | 2 / 2 |

REACTION PRODUCT

| Ex. No. | Theo. mole. weight | Color and state | Xylene solubility | Isopropanol solubility | Water solubility |
|---|---|---|---|---|---|
| 1a | 550 | Yellow very viscous liquid | Yes | Yes | No. |
| 2a | 560 | Tan liquid | | Yes | Emulsifiable. |
| 3a | 760 | Yellow liquid | Yes | Yes | |
| 4a | 950 | Dark yellow liquid | Yes | Yes | |
| 5a | 1,368 | Soft white solid | Yes | Yes | Dispersible. |
| 6a | 6,736 | White wax-like solid | Yes | Yes | Yes. |
| 7a | 518 | Light yellow oil | Yes | Yes | No. |
| 8a | 1,393 | Light yellow viscous liquid | Yes | Yes | No. |
| 9a | 460 | White oil | Yes | Yes | Dispersible. |
| 10a | 1,118 | Pale yellow viscous liquid | Yes | Yes | Do. |
| 11a | 958 | Brown viscous liquid | Yes | Yes | Do. |
| 12a | 6,178 | Brown soft solid | Yes | Yes | Yes. |
| 13a | 2,472 | Dark brown viscous liquid | Yes | Yes | Yes. |
| 14a | 960 | Brown liquid | Yes | Yes | Yes. |
| 15a | 1,254 | Amber colored viscous liquid | Yes | Yes | No. |
| 16a | 1,086 | Pale yellow oil | Yes | Yes | No. |
| 17a | 12,900 | White wax-like solid | Yes | Yes | Yes. |
| 18a | 1,128 | Light yellow viscous liquid | Yes | Yes | No. |
| 19a | 6,975 | Dark yellow viscous liquid | Yes | Yes | No. |
| 20a | 1,446 | Dark brown soft solid | No | Yes | No. |
| 21a | 1,950 | Light yellow viscous liquid | Yes | Yes | Dispersible. |
| 22a | 2,550 | ......do | Yes | Yes | Do. |
| 23a | 3,990 | Brown viscous liquid | Yes | Yes | Do. |
| 24a | 3,750 | Dark brown viscous liquid | Yes | Yes | Do. |
| 25a | 5,136 | Brown viscous liquid | Yes | Yes | Do. |
| 26a | 2,886 | Dark brown viscous liquid | Yes | Yes | No. |
| 27a | 520 | Golden yellow oil | Yes | Yes | No. |
| 28a | 920 | Light yellow viscous liquid | Yes | Yes | Dispersible. |
| 29a | 745 | Yellow viscous liquid | Yes | Yes | No. |
| 30a | 410 | Dark yellow oil | Yes | Yes | No. |
| 31a | 406 | Brown oil | Yes | Yes | No. |
| 32a | 806 | Yellow liquid | Yes | Yes | Dispersible. |
| 33a | 1,174 | Dark brown viscous liquid | Yes | Yes | Yes. |
| 34a | 3,460 | Dark brown semi-solid | Yes | Yes | Yes. |
| 35a | 2,490 | Dark brown very viscous liquid | Yes | Yes | Yes. |
| 36a | 1,656 | Dark brown viscous liquid | Yes | Yes | Yes. |
| 37a | 2,376 | ......do | Yes | Yes | No. |

NOTE 1.—Polyethylene glycols 200, 400, 600, 1,000, 6,000 etc. and polypropylene glycols 150, 1,025, etc. were products of Carbide and Carbon Chemicals Company having average molecular weights of 200, 400, 600, 1,000, 6,000 etc. and 150, 1,025 etc., respectively.

NOTE 2.—Methoxy polyethylene glycol 350, 750 etc. were polyethylene glycol monomethyl ethers having average molecular weights of 350, 750 etc., respectively. They were also products of Carbide and Carbon Chemical Company.

PART 4

The products herein described have utility for many purposes. Such products can all be used for the resolution of petroleum emulsions of the water-in-oil type. The products without further reaction are particularly valuable as additives for lubricating oils which are derived from sources other than petroleum.

As to specific uses for the herein described compounds, it is to be noted such compounds are valuable as a fuel oil additive in the manner described in U.S. Patent 2,553,183, dated May 15, 1951, to Caron et al. It can be used in substantially the same proportions or lower proportions and this is particularly true when used in conjunction with a glyoxalidine or amido glyoxalidine.

An analogous use in which these products are equally satisfactory, is that described in U.S. Patent No. 2,665,978, dated January 12, 1954, to Stayner et al. The amount employed is in the same proportion or lesser amounts than referred to in said aforementioned Caron et al. patent.

The second use is for the purpose of inhibiting fogs in hydrocarbon products as described in U.S. Patents No. 2,550,981 and 2,550,982, both dated May 1, 1951, both to Eberz. Here again it can be used in the same proportions as therein indicated or even smaller proportions.

A third use is to replace oil soluble petroleum sulfonates, so-called mahogany soaps, in the preparation of certain emulsions, or soluble oils or emulsifiable lubricants where such mahogany soaps are employed.

Another use is where the product does not serve as an emulsifying agent alone but serves as an adjunct.

Briefly stated, the fourth use is concerned with use as a coupling agent to be employed with an emulsifying agent. See "The Composition and Structure of Technical Emulsion," J. H. Goodey, Roy. Australian Chem. Inst. J. & Proc., vol. 16, 1949, pp. 47–75. As stated in the summary of this article, "The technical oil-in-water emulsion is regarded as a system of four components: the dispersion medium, consisting of the highly polar substance water; the disperse phase composed of hydrocarbons or other substances of comparatively weak polarity; the coupling agent, being an oil-soluble substance involving an hydroxyl, carboxyl or similar polar group; and the emulsifying agent, which is a water-soluble substance involving an hydrocarbon radical attached to an ionizable group."

Fifth, these materials have particular utility in increasing the yield of an oil well by various procedures which in essence involve fracturing of the strata by means of liquid pressure. A mixture of these products with oil, or oil in combination with a gel former alone or a gel former and finely divided mineral particles, yields a product which, when it reaches crevices in the strata which are yielding water, forms a gelatinous mass of curdy precipitate or solid or semi-solid emulsion of a high viscosity. In any event, it represents a rapid sealing agent for the strata crevices and permits pressure to be applied to fracture the strata without loss of fluid through crevices, openings or the like.

Such compounds or derivatives also are effective for other purposes, such as an anti-fogging agent in motor fuels, a coagulation preventive in burner oils, and as an additive for the prevention of corrosion of ferrous metals.

The herein described products and the derivatives thereof are particularly valuable in flooding processes, for recovery of oil from subterranean oil-bearing strata when employed in the manner described in U.S. Patent No. 2,233,381, dated February 25, 1941, to De Groote and Keiser.

Furthermore, the herein described products may be employed to increase operating efficiency by increasing the oil-to-brine ratio or by increasing the total oil recovery in primary recovery operations as differentiated from secondary recovery operations. The procedures employed are essentially those as described in either U.S. Patent No. 2,331,594, dated October 12, 1943, to Blair, or U.S. Patent No. 2,465,237, dated March 22, 1949, to Larsen.

When the products of the kind herein described are used for water flooding they have unusual value in a fresh water or brine system for the inhibition of the growth of both anaerobic and aerobic bacteria but are particularly applicable in controlling the sulfate reducing organisms which cause difficulty in secondary recovery operations. Thus, one may use some other agent or agents in water flood systems and use compounds as herein described primarily for reducing bacterial growth. The use of such an industrial bactericide is well known and the procedure is conventional; for instance, one can use the methods described in an article entitled "The Role of Microorganisms" by R. C. Allred, which appeared in Producers Monthly, vol. 18, No. 4, pages 18–22.

Specific attention is directed to the article entitled "Preparation of Water for Injection Into Water Reservoirs," which appeared in the Journal of Petroleum Technology, volume 7, No. 4, page 9 (April 1955). The author is Torrey.

PART 5

The products obtained in the manner herein described are valuable for various purposes as indicated in Part 4, preceding. However, one of the most important uses for the herein described products is as an intermediate for further reaction. It is obvious that reactions of the kind described previously invariably and inevitably yield oxyalkylation susceptible compounds, products or cogeneric mixtures. The reason is that when the oxirane ring is opened there is produced a hydroxyl group and this hydroxyl group is susceptible to oxyalkylation. Thus, the products previously described may be combined with a variety of reactants as chemical intermediates, for instance, with various diepoxides or polyepoxides. They may be combined with a number of other monoepoxides such as epichlorohydrin, styrene oxide, glycide and methylglycide. They may be reacted with alkyl glycidyl ether, glycidyl isopropyl ether, and glycidyl phenyl ether.

Furthermore, such products may be reacted with alkylene imines such as ethylene imine or propylene imine, to produce cation-active materials. Instead of an imine, one may employ what is a somewhat equivalent material, to wit, a dialkylaminoepoxypropane of the structure

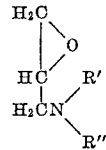

wherein R' and R" are alkyl groups.

Likewise, since the products have a hydroxyl group they may be combined by esterification with carboxy acids such as higher fatty acids, so as to change their characteristics or with polycarboxy acids, such as diglycolic, maleic acid, phthalic acid, succinic acid, and the like, to give resins, soft polymers or fractional esters which are essentially monomeric.

A variety of compounds can be formed by merely heating the reaction mass to a higher temperature and indeed sometimes in an effort to maintain a maximum yield of the desired compound there may be formed other products as a result of the change which takes place at least in part after the principal product of reaction has been formed. For example, further heating of the reaction mass, particularly in the presence of an acidic catalyst, can result in esterification, interesterification or esteramide interchange involving the carboxy group and a free hydroxyl group, depending upon the type of epoxidized material employed.

The carboxy group can also be further reacted with amines as described in our U.S. Patent 2,956,067 issued October 11, 1960.

Elsewhere reference has been made to the formation of dicarboxy acids by the reaction of glycol with 2 moles of epoxidized soybean fatty acid or methyl ester thereof. Similarly, glycerol, oxyalkylated glycerol, trimethylolethane, trimethylolpropane, or oxyalkylated derivatives thereof can be combined so as to form a tricarboxy acid. Similarly, diglycerol, pentaerythritol or the like and oxyalkylated derivatives thereof can be combined with 4 moles of epoxidized fatty acid or an ester thereof to form a tetracarboxy acid. Similarly, sorbitol, oxyalkylated sorbitol, dipentaerythritol, and oxyalkylated dipentaerythritol can be combined with 6 moles of epoxidized soybean fatty acid or esters of the same.

We claim:

The reaction products obtained by reacting at a temperature of about 65° C. to 170° C. for from about 1 to 5 hours (a) an oxirane ring-containing compound obtained by epoxidation of an unsubstituted epoxidation-susceptible material containing an ethylenic linkage selected from the class consisting of higher fatty acids containing 8 to 22 carbon atoms, lower alkanol esters of higher fatty acids containing 8 to 22 carbon atoms, amides of higher fatty acids containing 8 to 22 carbon atoms, and naturally occurring glycerides of higher fatty acids, said compound having on the average, approximately one oxirane ring on each fatty acid radicals, and (b) oxyalkylation-susceptible polyols and oxyalkylated polyols composed of carbon, hydrogen and oxygen atoms, said polyhydroxylated compounds being characterized by freedom from any radical having at least 8 uninterrupted carbon atoms, freedom from functional groups other than hydroxy groups and a molecular weight not in excess of 10,000; said reactants being nonresinous in nature; the proportions of (a) and (b) being from about 0.5 to 1 mole of (b) per oxirane ring in (a); the reaction involving rupture of each oxirane ring and being limited to formation of the following grouping

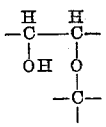

References Cited in the file of this patent
UNITED STATES PATENTS
2,942,013   Bruson et al. _____ June 21, 1960